United States Patent
Nozaki

(10) Patent No.: US 6,536,833 B2
(45) Date of Patent: Mar. 25, 2003

(54) DOOR WEATHER STRIP

(75) Inventor: Masahiro Nozaki, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/941,770

(22) Filed: Aug. 30, 2001

(65) Prior Publication Data

US 2002/0027378 A1 Mar. 7, 2002

(30) Foreign Application Priority Data

Sep. 4, 2000 (JP) ........................................ 2000-267022

(51) Int. Cl.[7] ................................................ B60J 10/08
(52) U.S. Cl. .................. 296/146.9; 49/480.1; 49/484.1; 49/495.1
(58) Field of Search ....................... 296/146.9; 49/480.1, 49/484.1, 495.1

(56) References Cited

U.S. PATENT DOCUMENTS 1,763,603 A * 6/1930 Donahue ............... 49/495.1 X

FOREIGN PATENT DOCUMENTS

| DE | 4314123 | * 11/1994 | ............. 296/146.9 |
| JP | 358063514 | * 4/1983 | ............. 296/146.9 |
| JP | 401160725 | * 6/1989 | ............. 296/146.9 |

* cited by examiner

Primary Examiner—Dennis H. Pedder
(74) Attorney, Agent, or Firm—Law Offices of David G. Posz

(57) ABSTRACT

A weather strip has a base portion and seal lips. The base portion has a base bottom portion attached to a door frame, side wall portions extending from substantially opposite sides of the base bottom portion, and a bridge portion connecting the opposite side wall portions. A hollow portion is formed by these portions. An exterior-side seal lip is provided to extend from a substantially border portion between the exterior-side side wall portion and the bridge portion. An interior-side seal lip is provided to extend from the bridge portion more interior than the exterior-side seal lip. In the bridge portion, the opposite sides of the root portion of the interior-side seal lip are formed into thin portions respectively. Thus, when the door is closed, even if the gap is narrowed, the interior-side seal lip is bent and the bridge portion is deformed easily in the thin portions so that the repulsion stress is restrained from increasing conspicuously.

10 Claims, 5 Drawing Sheets

DOOR WEATHER STRIP

BACKGROUND OF THE INVENTION

1. Field of the Invention

The present invention relates to a door weather strip provided at least in the upper portion of a door frame in the outer circumference of a door of a vehicle.

The present application is based on Japanese Patent Application No. Hei. 2000-267022, which is incorporated herein by reference.

2. Description of the Related Art

Generally, a door weather strip is provided in the outer circumference of a door of a vehicle such as a car or the like. For example, a door weather strip disclosed in Unexamined Japanese Patent Publication No. Hei. 11-48791 is attached to a door frame, and provided with a base portion having a hollow portion, and a seal lip extending from the base portion. Thus, sealing between the outer circumference of the door frame and a circumferential end portion of an opening of a vehicle body opposite to the outer circumference of the door frame is carried out by the seal lip.

However, when there occurs a slight unevenness (vertical unevenness) in the fitting of the door, particularly when the distance between the door frame and the vehicle body becomes larger than a predetermined distance, there is a fear that there is produced a gap between the tip end of the seal lip and the vehicle body so that it becomes difficult to ensure satisfactory sealing property.

It is therefore considered that a plurality of seal lips, that is, a vehicle-interior-side (hereinafter referred to as "interior-side" simply) seal lip and a vehicle-exterior-side (hereinafter referred to as "exterior-side" simply) seal lip are provided so that main sealing is ensured, for example, by the interior-side seal lip to thereby avoid such a defect caused by a gap (for example, see Japanese Utility Model Publication No. Sho. 61-59426).

However, with unevenness in the fitting of the door, the distance between the door frame and the vehicle body may be smaller than the predetermined distance. In this case, bending stress (repulsion stress) of the interior-side seal lip becomes too large. As a result, there is a fear that the bending stress may cause increase in the door closing force when the door is closed.

SUMMARY OF THE INVENTION

The present invention was developed to solve the foregoing problem. It is an object of the present invention to provide a door weather strip in which, even if there arises a slight unevenness in the fitting of a door, it is possible to avoid the deterioration of sealing property or a defect caused by the increase in the door closing force.

Description will be made below for attaining the foregoing object and so on. Operation, effect, and so on, peculiar to each will be added to the description in accordance with necessity.

A door weather strip according to a first aspect is constituted by: a base portion attachable to a door frame and having a hollow portion; an exterior-side seal lip extending from the base portion so as to carry out sealing between an outer circumference of the door frame and a circumferential end portion of an opening of a vehicle body opposite to the outer circumference of the door frame; and an interior-side seal lip extending from the base portion more interior than the exterior-side seal lip so as to carry out sealing between the outer circumference of the door frame and the circumferential end portion of the opening of the vehicle body opposite to the outer circumference of the door frame; wherein at least one of side parts on the base portion where a root portion of the interior-side seal lip is located is formed into a thin portion to be deformed easily.

According to the first aspect, the base portion having the hollow portion is attachable to the door frame, and the exterior-side and interior-side seal lips are extended from the base portion so as to carry out sealing between the outer circumference of the door frame and the circumferential end portion of the opening of the vehicle body opposite to the outer circumference of the door frame. Thus, even if the gap between the outer circumference of the door frame and the circumferential end portion of the opening of the vehicle body opposite to the outer circumference of the door frame becomes a little larger than a predetermined size due to the unevenness in the fitting of the door, the sealing property is ensured easily by the double sealing. In addition, at least one of the side parts on the base portion where a root portion of the interior-side seal lip is located is formed into a thin portion. Thus, even if the gap between the outer circumference of the door frame and the circumferential end portion of the opening of the vehicle body becomes a little smaller than the predetermined size, the side part of the interior-side seal lip on the base portion is easily deformed so that bending stress is prevented from increasing conspicuously. It is therefore possible to make it difficult to produce a defect due to increase in the closing force when the door is closed.

"At least one of the side parts of the interior-side seal lip on the base portion" may be replaced by "the opposite side parts of the interior-side seal lip on the base portion". With such a configuration, it is possible to make it easier to suppress the increase in stress caused by deformation.

In addition, a door weather strip according to a second aspect is constituted by: a base portion having a base bottom portion attached to a door frame, an interior-side side wall portion and an exterior-side side wall portion extending from substantially opposite sides of the base bottom portion, and a bridge portion connecting tip ends of the opposite side wall portions, a hollow portion being formed by the base bottom portion, the opposite side wall portions and the bridge portion; an exterior-side seal lip extending from a substantially border portion between the exterior-side side wall portion and the bridge portion so as to carry out sealing between an outer circumference of the door frame and a circumferential edge or a circumferential end portion of an opening of a vehicle body opposite to the outer circumference of the door frame; and an interior-side seal lip extending from the bridge portion more interior than the exterior-side seal lip so as to carry out sealing between the outer circumference of the door frame and the circumferential end portion of the opening of the vehicle body opposite to the outer circumference of the door frame; wherein at least one of side parts on the bridge portion where a root portion of the interior-side seal lip is located is formed into a thin portion to be deformed easily.

According to the second aspect, sealing between the outer circumference of the door frame and the circumferential edge or the circumferential end portion of the opening of the vehicle body opposite to the outer circumference of the door frame is carried out by the exterior-side and interior-side seal lips. The exterior-side seal lip extends from a substantially border portion between the exterior-side side wall portion and the bridge portion. The interior-side seal lip extends from the bridge portion more interior than the exterior-side seal lip. Thus, even if the gap between the outer circumference of the door frame and the circumferential end portion of the opening of the vehicle body opposite to the outer circumference of the door frame becomes a little larger than a predetermined size due to the unevenness in the fitting of the door, the sealing property is ensured easily by the double sealing. In addition, at least one of the side parts on the bridge portion where a root portion of the interior-side seal lip is located is formed into a thin portion. Thus, even if the gap between the outer circumference of the door frame and the circumferential end portion of the opening of the vehicle body becomes a little smaller than the predetermined size, the side part of the interior-side seal lip on the bridge portion is easily deformed so that bending stress is prevented from increasing conspicuously. It is therefore possible to make it difficult to produce a defect due to increase in the closing force when the door is closed.

"At least one of the side parts on the bridge portion" maybe replaced by "the opposite side parts on the bridge portion". With such a configuration, it is possible to make it easier to suppress the increase in stress caused by deformation.

Bending allowance of the interior-side seal lip is preferably set to be larger than that of the exterior-side seal lip.

The bending allowance of the interior-side seal lip is set to be larger than that of the exterior-side seal lip. Thus, sealing between the outer circumference of the door frame and the circumferential end portion of the opening of the vehicle body is carried out chiefly by the interior-side seal lip. In the above, a substitute constitution "the exterior-side seal lip may be designed almost not to bend when the door is closed" may be adapted.

The exterior-side seal lip is preferably set to be substantially on the same plane as an exterior side-surface of the vehicle body when a door is closed.

The exterior-side seal lip is set to be substantially on the same plane as the exterior side-surface of the vehicle body when the door is closed. Thus, it can be made difficult to recognize a recess portion between the vehicle body and the door frame visually from the outside. As a result, so-called "flush surface" is done so that the appearance quality can be improved conspicuously.

At least the interior-side seal lip is preferably formed out of a foamed elastic material.

At least the interior-side seal lip is formed out of a foamed elastic material. Thus, the interior-side seal lip itself is deformed easily. As a result, even if the gap between the outer circumference of the door frame and the circumferential end portion of the opening of the vehicle body becomes a little smaller than the predetermined size, it becomes easier to suppress the increase in bending stress.

At least the interior-side seal lip is preferably provided to extend toward the exterior side.

At least the interior-side seal lip is provided to extend toward the exterior side. Thus, it can be made difficult to produce an abnormal sound when the door is opened.

At least an exterior side surface of the exterior-side seal lip is preferably formed out of a solid elastic material harder and more lustrous than a foamed elastic material.

At least the exterior side surface of the exterior-side seal lip is formed out of a solid elastic material harder and more lustrous than a foamed elastic material. Thus, the appearance quality becomes excellent when the exterior-side seal lip is recognized visually from the outside.

At least a part of the base portion is preferably formed out of a solid elastic material harder than a foamed elastic material.

The base portion formed out of the solid elastic material is difficult to be deformed. Thus, the attachment stability of the base portion can be improved. "At least a part of the base portion" may be replaced by "the base portion", "the base bottom portion" or "the base bottom portion and at least one of the side wall portions".

In the door weather strip according to the present invention, when the door is closed, the interior-side seal lip per se is bent first, and the base portion or the bridge portion is further deformed at the thin portion formed in the side part of the root portion of the interior-side seal lip into the hollow portion. Namely, the door weather strip according to the present invention attains its deformation in two steps. As a result, while the operativity of the door closing is secured, sealing characteristics is improved.

Features and advantages of the invention will be evident from the following detailed description of the preferred embodiments described in conjunction with the attached drawings.

DETAILED DESCRIPTION OF THE PREFERRED EMBODIMENTS

Description will be made below about an embodiment of the present invention with reference to the drawings.

Figure 1:
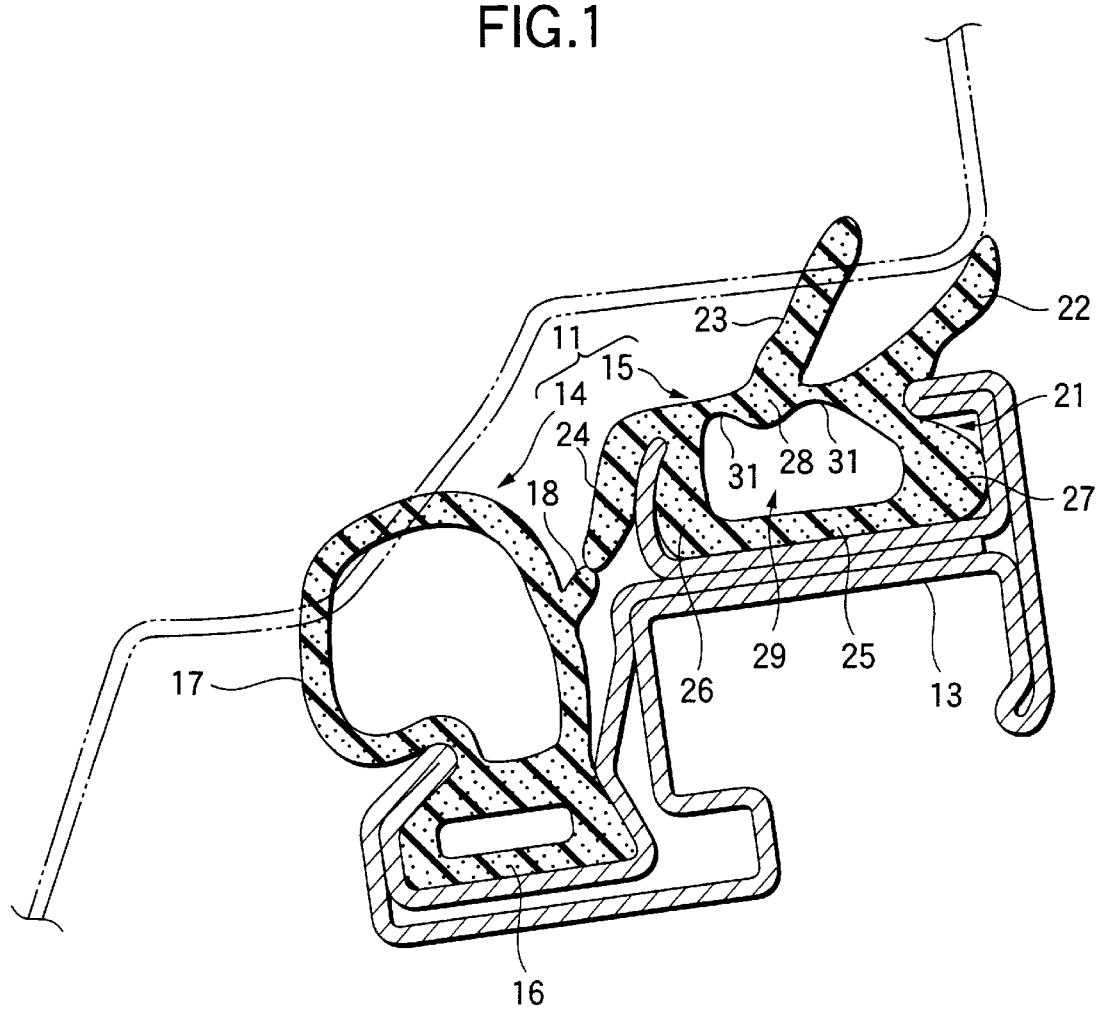
FIG. 1 is a sectional view taken on line I—I in FIG. 2, showing the structure of a weather strip according to an embodiment.
Figure 2:
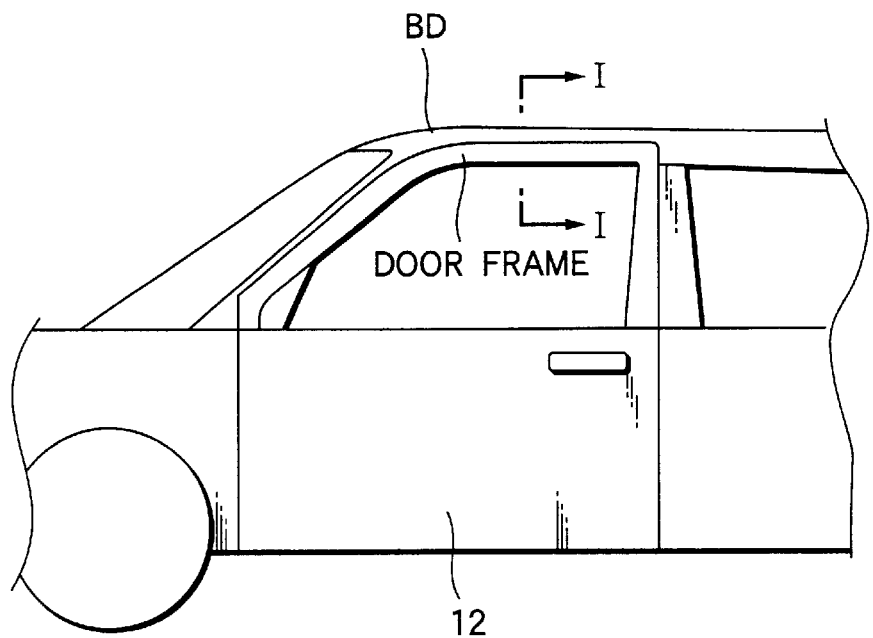
FIG. 2 is a side view showing a vehicle in focus on a door thereof.

As shown in FIGS. 1 and 2, a weather strip 11 formed out of EPDM sponge rubber (ethylene-propylene-diene copolymer sponge rubber) is provided in accordance with the outer circumferential shape of a car door 12. For more detailed description, a door frame 13 in the outer circumferential upper portion of a door 12 is provided in the door 12, and a main weather strip 14 and a sub-weather strip 15 are installed in the door frame 13 respectively.

The main weather strip 14 is provided on the interior side. The main weather strip 14 has a base portion 16, a hollow main seal 17 formed integrally with the base portion 16, and an auxiliary lip 18 provided in the main seal 17. On the other hand, the sub-weather strip 15 is provided on the exterior side. The sub-weather strip 15 has a base portion 21, an exterior-side seal lip 22, an interior-side seal lip 23, and an auxiliary lip 24. The tip ends of the respective auxiliary lips 18 and 24 abut against each other or overlap each other. As a result, the upper portion of the door frame 13 is prevented from being recognized visually from the outside when the door 12 is opened. Now, since this embodiment has a feature in the sub-weather strip 15, description will be made below chiefly about the configuration of the sub-weather strip 15 and so on.

Figure 3:
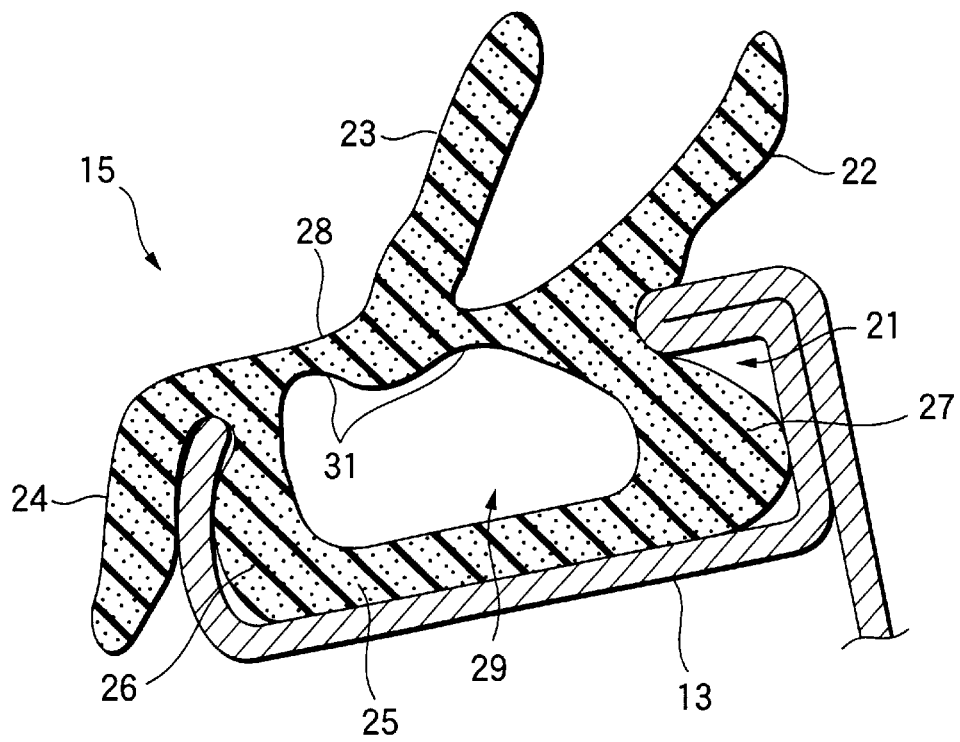
FIG. 3 is a sectional view showing the configuration of a weather strip.

As shown in FIG. 3, the sub-weather strip 15 has a base portion 21 having a substantially angled O-shape in section. The base portion 21 has a base bottom portion 25 attached to the door frame 13 so as to be fitted therein, an interior-side side wall portion 26 and an exterior-side side wall portion 27 extending from substantially opposite sides of the base bottom portion 25, and a bridge portion 28 connecting the opposite side wall portions 26 and 27. Then, a hollow portion 29 is formed by the base bottom portion 25, the opposite side wall portions 26 and 27, and the bridge portion 28.

In addition, the exterior-side seal lip 22 is provided to extend from the substantially border portion (corner portion) between the exterior-side side wall portion 27 and the bridge portion 28. The exterior-side seal lip 22 carries out, so to speak, auxiliary sealing between the outer circumference of the door frame 13 and the circumferential end portion of an opening of a vehicle body BD opposite to the outer circumference of the door frame 13. The exterior-side seal lip 22 is set not to bend so much even when the door 12 is closed. In addition, one of the side surfaces of the exterior-side leading end of the exterior-side seal lip 22 is set to be substantially on the same plane with the exterior side-surface of the vehicle body BD when the door 12 is closed.

Further, the interior-side seal lip 23 is provided to extend from the bridge portion 28 more interior than the exterior-side seal lip 22. The interior-side seal lip 23 carries out sealing chiefly between the outer circumference of the door frame 13 and the circumferential end portion of the opening of the vehicle body BD. That is, when the door 12 is closed, the interior-side seal lip 23 can bend more largely than the exterior-side seal lip 22. Thus, even if there were formed a gap between the leading end of the exterior-side seal lip 22 and the circumferential end portion of the opening of the vehicle body BD, sealing between the outer circumference of the door frame 13 and the circumferential end portion of the opening of the vehicle body BD could be carried out surely by the interior-side seal lip 23.

Meanwhile, in this embodiment, in the bridge portion 28, the opposite side parts of the root portion of the interior-side seal lip 23 are formed into thin portions 31. As a result, the bridge portion 28 is deformable easily in these thin portions 31 when the door 12 is closed.

Next, description will be made about the operation and effect of the sub-weather strip 15 configured thus. In this embodiment, sealing between the outer circumference of the door frame 13 and the circumferential end portion of the opening of the vehicle body BD opposite to the outer circumference of the door frame 13 is carried out by the exterior-side seal lip 22 and the interior-side seal lip 23. Thus, even if the gap between the outer circumference of the door frame 13 and the circumferential end portion of the opening of the vehicle body becomes a little larger than a predetermined size due to the unevenness in the fitting of the door 12, sufficient sealing property can be ensured by the double sealing. As a result, it is possible to suppress a defect such as deterioration of appearance quality, or production of wind noise. Particularly, since the bending allowance of the interior-side seal lip 23 is set to be larger than that of the exterior-side seal lip 22 in this embodiment, sealing is ensured chiefly by the interior-side seal lip 23.

In addition, when the door 12 is closed, the exterior-side seal lip 22 disposed on the exterior side-surface of the vehicle body BD does not bend so much. In addition, the exterior-side seal lip 22 is located substantially on the same plane as the exterior side-surface of the vehicle body BD. Thus, it can be made difficult to recognize a recess portion between the vehicle body BD and the door frame 13 visually from the outside. As a result, so-called "flush surface" is done so that the appearance quality can be further improved.

Figure 4A:
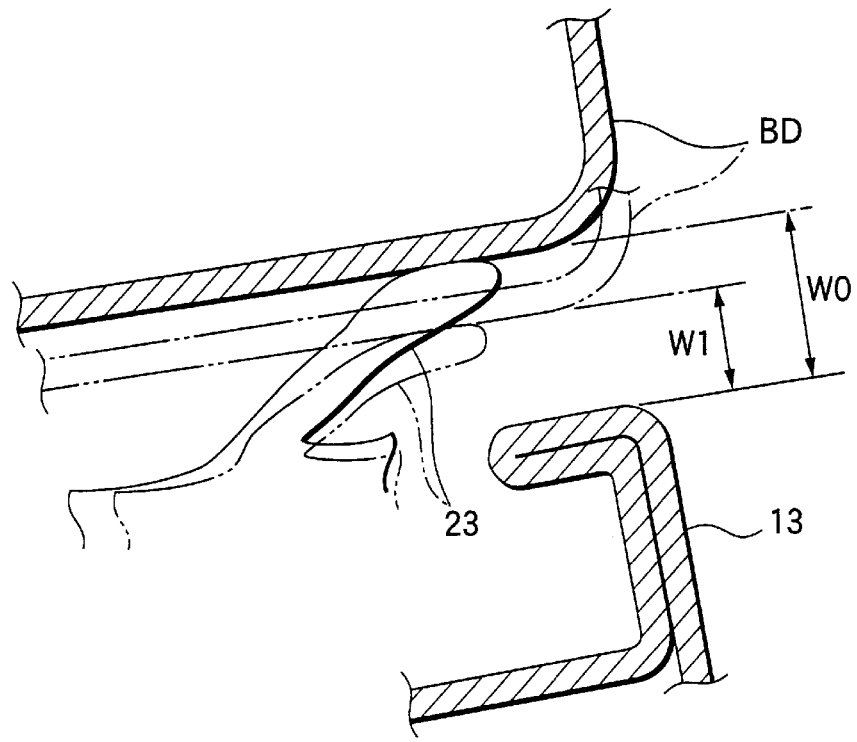
FIG. 4A is a partially sectional view for explaining the state of bending of an interior-side seal lip when there is produced a deviation in the gap between the outer circumference of a door frame and the circumferential end portion of an opening of a vehicle body.
Figure 4B:
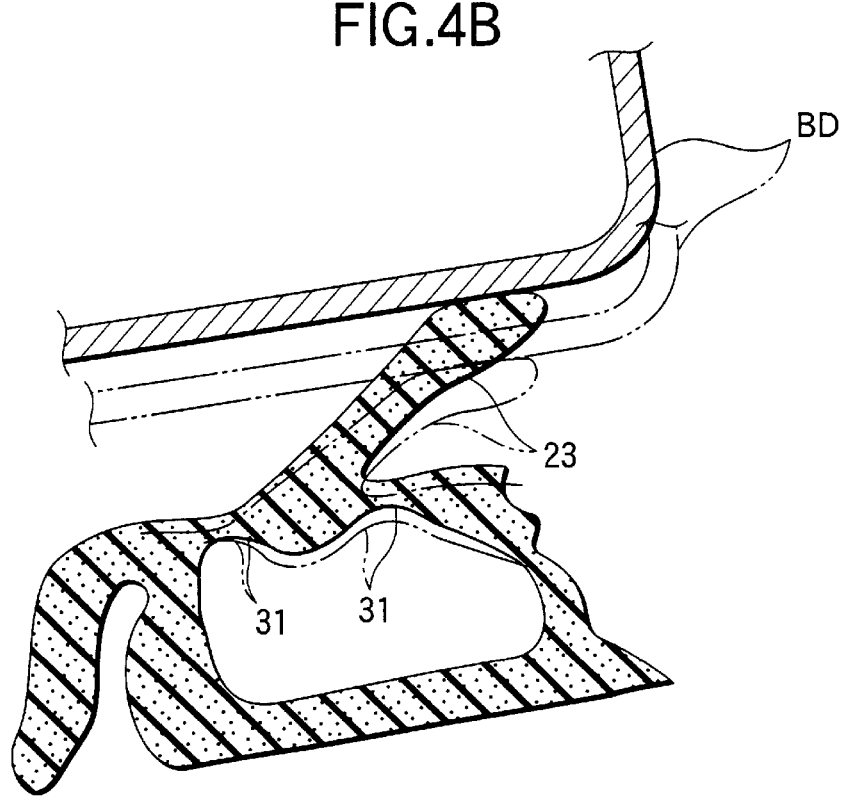
FIG. 4B is a sectional view for explaining the degree of deformation of thin portions.

Further, as shown in FIG. 4A, a gap W1 between the outer circumference of the door frame 13 and the circumferential end portion of the opening of the vehicle body BD may be smaller than a predetermined gap (proper gap) W0. In this case, the interior-side seal lip 23 bends largely, as shown by the two-dot chain line in FIG. 4A, so that the repulsion stress increases with the increase of such bending when the gap W1 is narrower than the proper gap W0, while the interior-side seal lip 23 bends as shown in the solid line in FIG. 4A when the gap W1 is equal to the proper gap W0. However, as shown in FIG. 4B, since the opposite side parts of the root portion of the interior-side seal lip 23 on the bridge portion 28 are formed into the thin portions 31. Thus, the interior-side seal lip 23 is deformed easily in the thin portions 31. It is therefore possible to restrain the repulsion stress from increasing conspicuously.

Figure 5:
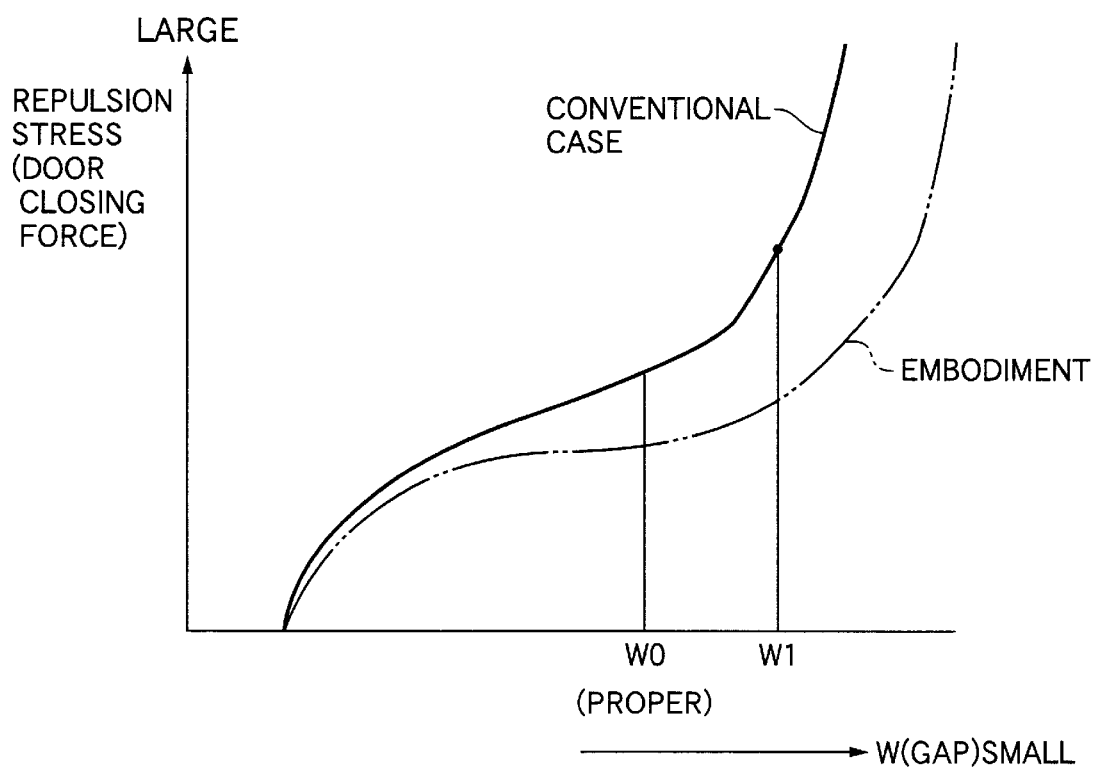
FIG. 5 is a graph showing the relationship between the repulsion force (door closing force) and a change of the gap between the outer circumference of the door frame and the circumferential end portion of the opening of the vehicle body in this embodiment in comparison with that in the conventional case.

FIG. 5 is a graph showing the relationship between the repulsion force (door closing force) and a change of a gap W between the outer circumference of the door frame 13 and the circumferential end portion of the opening of the vehicle body BD in this embodiment in comparison with that in the conventional case, in order to explain such operation and effect. As shown in FIG. 5, both in the embodiment and in the conventional case, there is a tendency that the repulsion force increases as the gap W becomes smaller. Here, in the conventional case, there is no problem when the gap W is equal to the proper gap W0. However, if the gap W becomes smaller than the proper gap W0, there arises some degree of a limit in the bending of the interior-side seal lip 23 itself. Thus, the interior-side seal lip 23 is brought into a so-called "bumping state". Then, when the gap W becomes equal to the gap W1 which is smaller than the proper gap W0, the repulsion stress increases conspicuously so that the door closing force becomes large. On the other hand, in this embodiment, the interior-side seal lip 23 is deformed in the thin portions 31 in addition to bending of the interior-side seal lip 23 itself. Thus, even if the gap W becomes equal to the narrow gap W1 due to the unevenness in the fitting of the door 12, the repulsion stress does not increase so much. That is, even if the gap W becomes narrow, the deviation thereof is absorbed by the existence of the thin portions 31, and hence the door closing force is prevented from increasing conspicuously.

In addition, the interior-side seal lip 23 is provided to extend toward the exterior side. Thus, it is possible to make it difficult to produce an abnormal sound when the door 12 is opened. Namely, the interior-side seal lip 23 is difficult to turn over toward the interior side.

Incidentally, the present invention is not limited to the contents described in the above-mentioned embodiment, but it may be carried out, for example, as follows. Not to say, other applications and modifications not shown below may be carried out.

(a) In the above-mentioned embodiment, the sub-weather strip 15 was formed out of EPDM sponge rubber as a foamed elastic material. However, solid rubber (for example, EPDM solid rubber) harder and more lustrous than the sponge rubber may be adopted partially.

Figure 6:
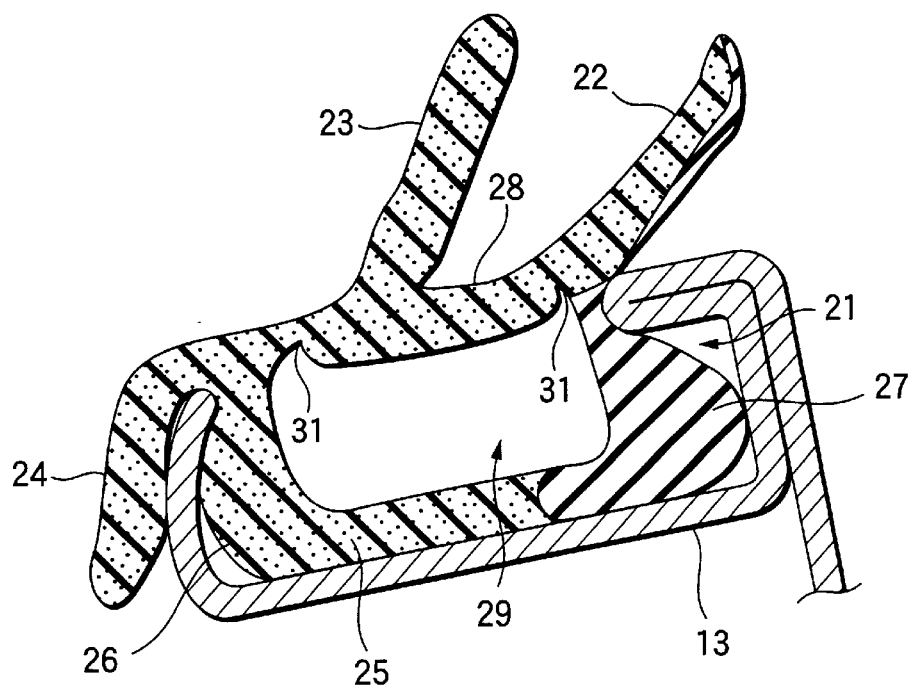
FIG. 6 is a sectional view showing the structure of a weather strip according to another embodiment.

For example, FIG. 6 is a sectional view showing an embodiment in which a part of the base portion 21 and the exterior side of the exterior-side seal lip 22 are formed out of EPDM solid rubber, while the other portions are formed out of EPDM sponge rubber. With such arrangement, the appearance quality becomes excellent when the exterior-side seal lip 22 is recognized visually from the outside. In addition, the base portion 21 is difficult to be deformed so that the attachment stability can be improved.

In addition, as shown in FIG. 6, notches may be provided in the vicinities of the corner portions between the bridge portion 28 and the opposite side wall portions 26 and 27 respectively so as to form the thin portions 31.

Figure 7:
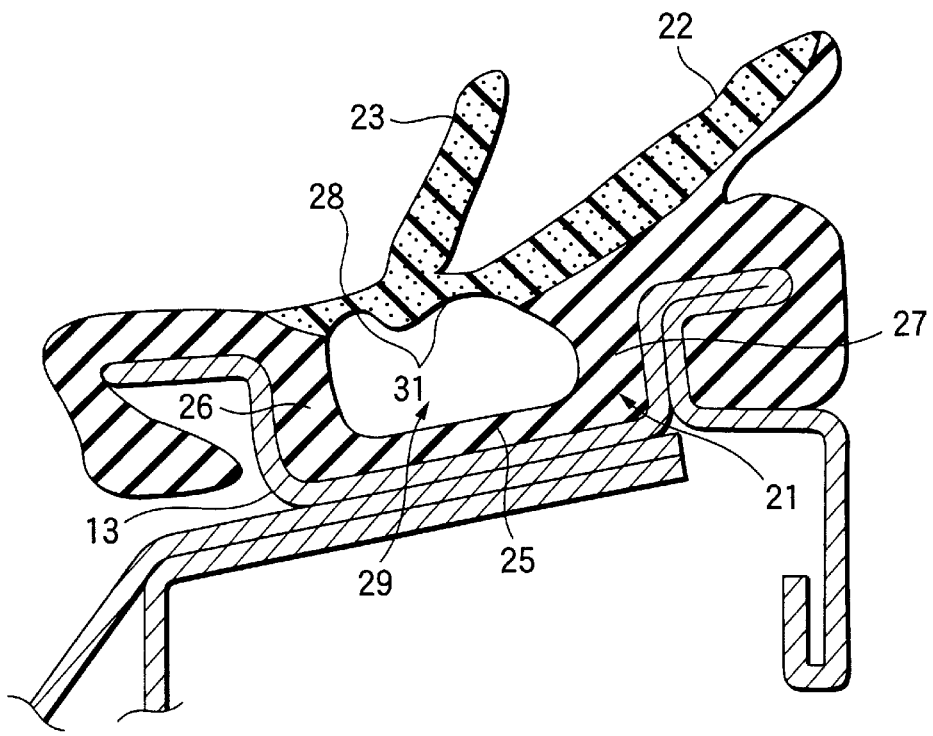
FIG. 7 is a sectional view showing the structure of a weather strip according to another embodiment.

(b) Further, FIG. 7 is a sectional view showing an embodiment in which most of the base portion 21, that is, the base bottom portion 25, the opposite side wall portions 26 and 27, the exterior side portion of the exterior-side seal lip 22, and so on, are formed out of EPDM solid rubber while the bridge portion 28, the interior-side seal lip 23 and the interior side portion of the exterior-side seal lip 22 are formed out of EPDM sponge rubber. With such arrangement, the attachment state can be made more stable than that in FIG. 6.

In addition, in the above-mentioned embodiment, protrusion portions on the opposite sides of the base bottom portion 25 are engaged with the recess portion of the door frame 13 so that the sub-weather strip 15 is capable of being attached to the door frame 13. However, as shown in FIG. 7, hook portions may be provided in the base portion 21. In this case, the hook portions are hung on a flange-like frame so that the sub-weather strip 15 is attached to the frame.

Further, as shown in FIG. 7, there is no problem if the auxiliary lip 24 is omitted.

(c) The weather strip 11 was constituted by the main weather strip 14 and the sub-weather strip 15 in the above-mentioned embodiment. However, only the sub-weather strip 15 may be attached to the door frame as shown in this embodiment. That is, this embodiment can be implemented also to omit the main weather strip 14.

(d) In the above-mentioned embodiment, EPDM is adopted as a material for forming the weather strip 11. However, the weather strip 11 may be formed out of another elastic material such as thermoplastic olefin elastomer (TPO), soft polyvinyl chloride, or the like.

(e) In addition to the exterior-side and interior-side seal lips 22 and 23 in the above-mentioned embodiment, another seal lip may be provided for carrying out sealing between the outer circumference of the door frame 13 and the circumferential end portion of the opening of the vehicle body BD.

The present invention is not limited to the description of the modes for carrying out the invention and the embodiments thereof at all. The present invention includes various changes and modifications that can be conceived easily by those skilled in the art without departing from the scope of claim.

What is claimed is:

1. A door weather strip, comprising:
   a base portion attachable to a door frame and having a hollow portion;
   a vehicle-exterior-side seal lip extending from said base portion so as to carry out sealing between an outer circumference of said door frame and a circumferential end portion of an opening of a vehicle body opposite to said outer circumference of said door frame; and
   a vehicle-interior-side seal lip extending from said base portion more interior than said vehicle-exterior-side seal lip so as to carry out sealing between said outer circumference of said door frame and said circumferential end portion of said opening of said vehicle body opposite to said outer circumference of said door frame;
   wherein at least one of side parts on said base portion where a root portion of said vehicle-interior-side seal lip is located is formed into a thin portion and a bending allowance of said vehicle-interior-side seal lip is set to be larger than that of said vehicle-exterior-side seal lip.

2. A door weather strip according to claim 1, wherein at least a vehicle-exterior-side surface of said vehicle-exterior-side seal lip is formed out of a solid elastic material harder and more lustrous than a foamed elastic material.

3. A door weather strip according to claim 1, wherein said vehicle-exterior-side seal lip is set to be substantially on the same plane as a vehicle-exterior side-surface of said vehicle body when a door is closed.

4. A door weather strip according to claim 1, wherein at least said vehicle-interior-side seal lip is formed out of a foamed elastic material.

5. A door weather strip according to claim 1, wherein at least said vehicle-interior-side seal lip is provided to extend toward said vehicle-exterior side.

6. A door weather strip, comprising:
- a base portion having a base bottom portion attachable to a door frame, a vehicle-interior-side side wall portion and a vehicle-exterior-side side wall portion extending from substantially opposite sides of said base bottom portion, and a bridge portion connecting leading ends of said opposite side wall portions, a hollow portion being formed by said base bottom portion, said opposite side wall portions and said bridge portion;
- a vehicle-exterior-side seal lip extending from a substantially border portion between said vehicle-exterior-side side wall portion and said bridge portion so as to carry out sealing between an outer circumference of said door frame and a circumferential end portion of an opening of a vehicle body opposite to said outer circumference of said door frame; and
- a vehicle-interior-side seal lip extending from said bridge portion more interior than said vehicle-exterior-side seal lip so as to carry out sealing between said outer circumference of said door frame and said circumferential end portion of said opening of said vehicle body opposite to said outer circumference of said door frame;

wherein at least one of side parts on said bridge portion where a root portion of said vehicle-interior-side seal lip is located is formed into a thin portion and a bending allowance of said vehicle-interior-side seal lip is set to be larger than that of said vehicle-exterior-side seal lip.

7. A door weather strip according to claim 6, wherein said vehicle-exterior-side seal lip is set to be substantially on the same plane as a vehicle-exterior side-surface of said vehicle body when a door is closed.

8. A door weather strip according to claim 6, wherein at least said vehicle-interior-side seal lip is formed out of a foamed elastic material.

9. A door weather strip according to claim 6, wherein at least-said vehicle-interior-side seal lip is provided to extend toward said vehicle-exterior side.

10. A door weather strip according to claim 6, wherein at least a vehicle-exterior-side surface of said vehicle-exterior-side seal lip is formed out of a solid elastic material harder and more lustrous than a foamed elastic material.

* * * * *